UNITED STATES PATENT OFFICE.

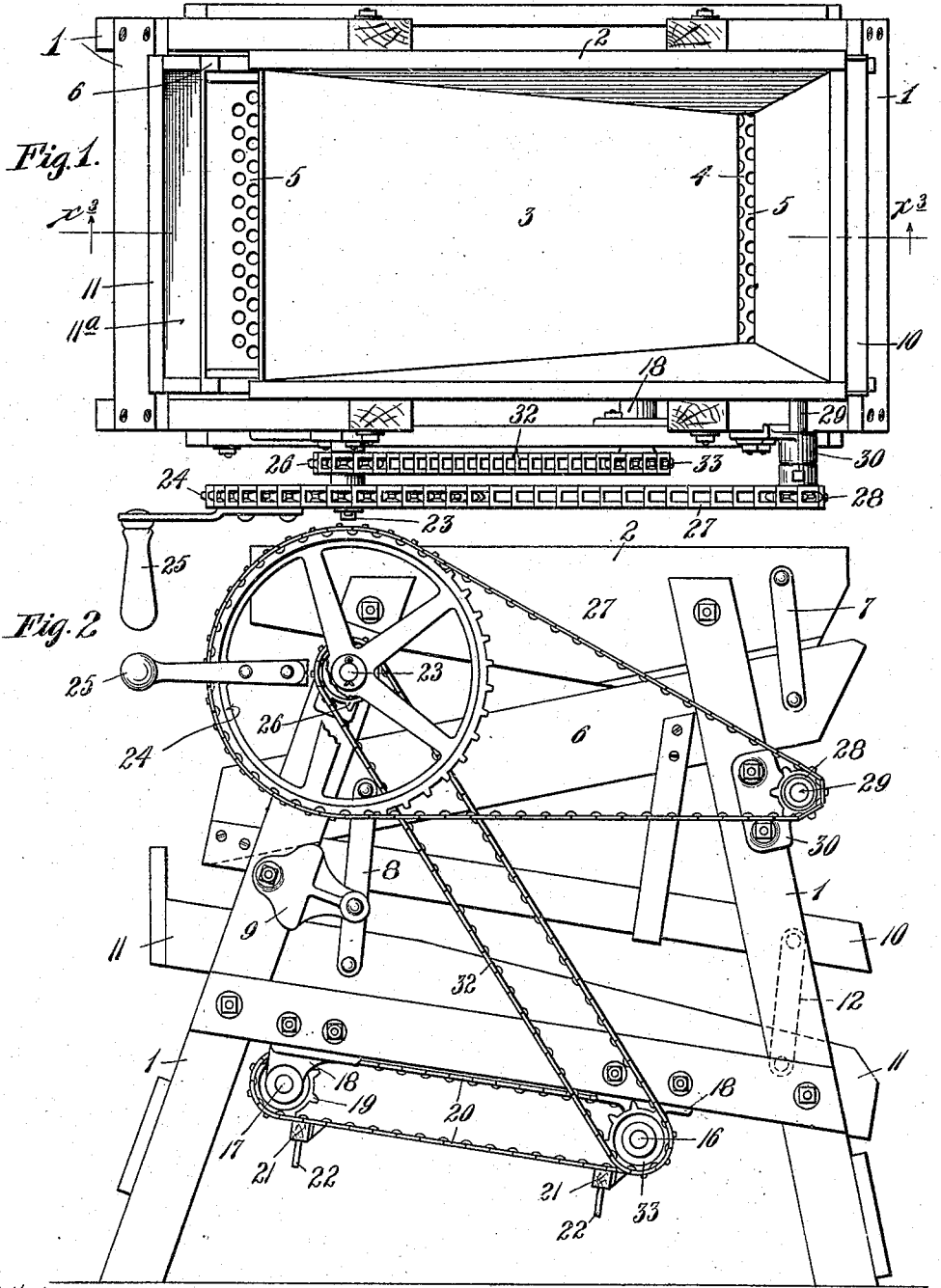

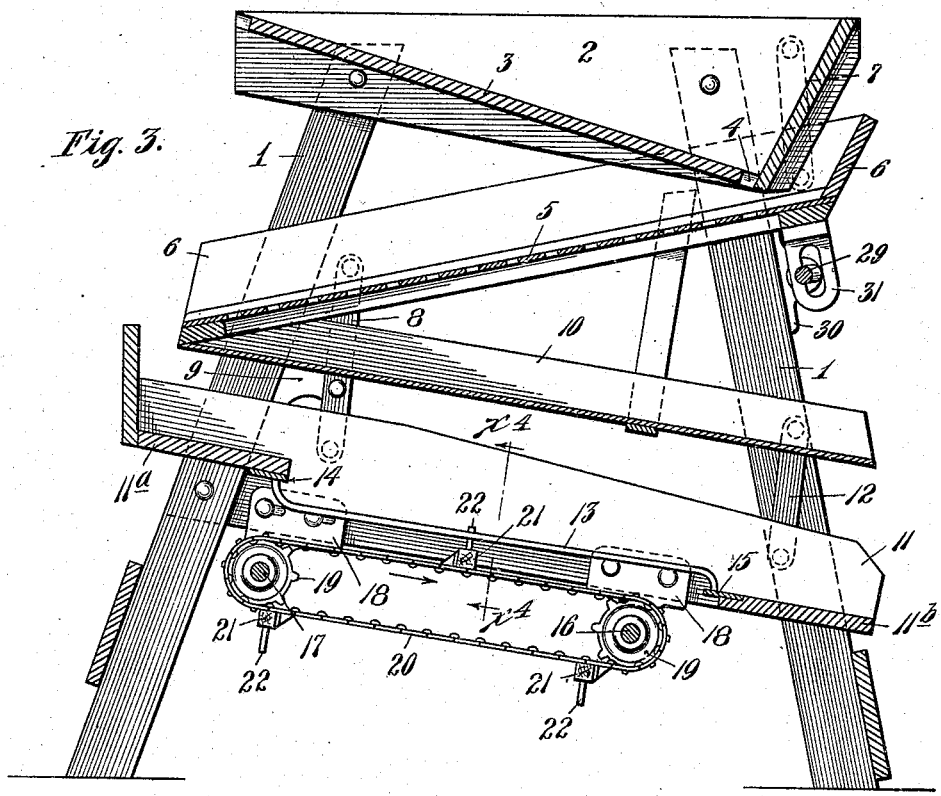
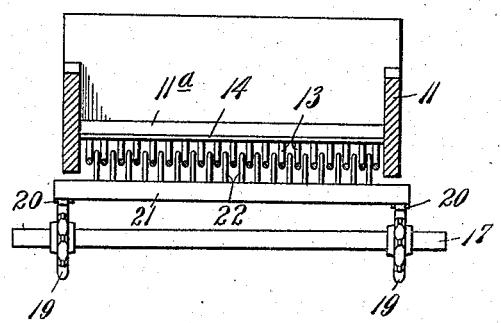

CHARLES F. ASPLUND, OF MINNEAPOLIS, MINNESOTA.

SEED-CORN SEPARATOR.

No. 907,947.  
Specification of Letters Patent.  
Patented Dec. 29, 1908.

Application filed March 2, 1906. Serial No. 303,787.

*To all whom it may concern:*

Be it known that I, CHARLES F. ASPLUND, a citizen of the United States, residing at Minneapolis, in the county of Hennepin and State of Minnesota, have invented certain new and useful Improvements in Seed-Corn Separators; and I do hereby declare the following to be a full, clear, and exact description of the invention, such as will enable others skilled in the art to which it appertains to make and use the same.

My invention has for its object to provide a seed corn separator of simplified construction and increased efficiency, and to the above ends the invention consists of the novel devices and combinations of devices hereinafter described and defined in the claim.

It is a well known fact that the kernels of corn that grow at or near the ends of the cob are thick and short and in many instances, are nearly spherical in form, although of irregular outline; and it is also known that the kernels that grow at the central and intermediate portions of the cob are quite flat and quite thin, but of much larger outline than those that grow near the end of the cob.

Scientific experiments have demonstrated that the large and flat kernels from the central portions of the cob, when used as seed, will produce a much better growth of corn than will the stubby kernels from the end portions of the cob, and that this is true both with respect to the quantity and the quality of the corn grown from such seed corn.

My improved machine was designed and operates to separate the large, flat kernels of corn from all small kernels and from all thick or spherical and irregular kernels of corn.

The improved machine in its preferred form is illustrated in the accompanying drawings, wherein like characters indicate like parts throughout the several views.

Figure 1 is a plan view of the improved machine. Fig. 2 is a right side elevation of the same. Fig. 3 is a vertical section taken through the machine on the line $x^3$ $x^3$ of Fig. 1; and Fig. 4 is a detail in section taken transversely through a portion of the machine on the line $x^4$ $x^4$ of Fig. 3.

The numeral 1 indicates a suitable frame which supports an elevated hopper 2 which, as shown, is provided with a sliding bottom 3 that is adapted to afford a variable discharge opening 4 at the extreme bottom of the hopper.

Immediately underlying the hopper 2 is an inclined screen 5 that is detachably secured to and carried by a vibratory shoe 6, which shoe at its upper end, is, as shown, supported from the hopper 2 by a pair of links 7, and at its lower end is supported by the upper ends of a pair of levers 8 pivoted at their intermediate portions to brackets 9 rigidly secured on the frame 1. Rigidly secured to the shoe 6, below the screen 5, but inclining in a direction reverse to the screen 5, is an imperforate discharge deck 10. Below the deck 10 is a second vibratory shoe 11 which, at its upper end, is supported by the lower ends of the levers 8, and at its lower end, is supported by a pair of links 12 which latter, at their upper ends, are pivoted to the adjacent edge of the frame 1. This shoe 11, at its intermediate portion, is cut away, and in this cut away portion is provided with a separating grate made up of parallel rods 13. These grate forming rods 13 extend in an inclined plane, longitudinally of the shoe 11, and their upper ends are preferably turned upward and rigidly secured to a tie bar 14, while their lower ends are turned downward and rigidly secured to a tie bar 15. The tie bar 14 is rigidly secured to the upper deck portion 11$^a$ of the shoe 11, while the tie bar 15 is rigidly secured to the lower deck portion 11$^b$ of said shoe. These grate rods 13 are evenly spaced apart the proper distance to permit the large and flat kernels of corn to pass between them, but to prevent the passage between them of any of the round, thick or chunky kernels of corn.

To positively prevent the permanent lodgment of any of the kernels of corn between the grate bars, I provide a combing device, preferably in the form of an endless carrier having a plurality of combs, the teeth of which combs work between the rods of the grate and serve to positively dislodge and discharge any of the kernels of corn which may have become lodged and stuck between the grate rods. This combing device, as shown and preferred, involves a pair of transverse shafts 16 and 17 mounted in suitable bearings 18 on the frame 1 and each provided with a pair of sprockets 19. Sprocket chains 20 run over the alined sprockets of the two shafts 16 and 17. Combs made up of bars 21 and teeth 22 extend transversely of the chains 20 and are attached thereto so that they are moved in succession into action on the grate 13. The sprocket chains 20 will, of course, be driven in the direction of the arrow marked thereon in Fig. 3.

Motion will be imparted to the several movable parts of the machine, preferably through the following devices: Loosely journaled on a stud 23 secured on one side of the frame 1, is a large driving sprocket 24 which is provided with an operating crank 25, and on its hub, is provided with a small driving sprocket 26. A sprocket chain 27 runs over the large sprocket 24 and over a sprocket 28 which is carried by one end of a crank shaft 29 mounted in suitable bearings 30 on the frame 1. This crank shaft 29 extends transversely of the machine, and its intermediate crank portion works in the slot of a slotted bracket or lug 31 that is rigidly secured to the upper vibratory shoe 6, as best shown in Fig. 3. As is evident, rotation of the crank shaft 29 will vibrate the upper shoe 6 and parts carried thereby, and through the levers 8 simultaneous vibratory movements, in reverse direction, will be imparted to the lower shoe 11 and the separating grate 13. A sprocket chain 32 runs over the small driving sprocket 26 and over a sprocket 33 secured to one end of the sprocket equipped shaft 16, and hence imparts rotary movement to said shaft 16 and consequently to the shaft 17 and sprocket chains 20.

The shelled corn is, of course, placed within the hopper 2 and will be fed onto the screen 5 through the opening 4, such feed movements being insured by the jar or vibratory movements imparted to the complete machine, under the action of the crank shaft 29. All small kernels of corn, whether round or of other form, will pass through the perforations or meshes of the screen 5, and dropping onto the deck 10, will be discharged from the machine at a point where they can not again be commingled with the better grade of seed corn. In other words, the screen 5 takes out and disposes of all small inferior kernels.

The large, flat kernels or high grade seed corn, together with all of the large size, thick, irregular and otherwise inferior large kernels, will be delivered by the sieve 5 onto the receiving deck section 11ª of the lower shoe 11, and thence onto the separating grate 13. Under the vibratory movements of the shoe 11, all of the flat kernels of desired predetermined thickness, will fall through the grate or between the rods thereof, while the large, thick or otherwise irregular, inferior kernels, not being able to pass between the rods of the grate, must pass over the grate onto the lower deck section 11ᵇ, from whence they will be discharged. Kernels of corn which are of but slightly too great thickness to pass between the rods of the grate, will very frequently be lodged and tightly stuck between the grate rods, so that they can not be released or discharged by any ordinary vibratory or jarring action. This is particularly so of flat kernels which have large outer ends, or projections on their outer ends. Such kernels will fall nearly through the grate, but will then become lodged in such manner that they can be removed only by applying direct force thereto. The combing device described will, as is obvious, readily remove all such lodged kernels of corn from the grate. The teeth of the comb project between the rods of the grate and move longitudinally thereof, so that any lodged kernels of corn will be scraped downward to the lower end of the grate and will be there discharged onto the deck section 11ᵇ. Of course, any suitable devices may be provided for catching the selected seed corn which falls through the grate 13 and for catching the rejected corn which is discharged from the decks 10 and 11ᵇ.

The action of the crank shaft 29 on the slotted bracket 31 is such as to impart to the shoe 6, and hence also to the shoe 11, what is known as a hammer-shake action, that is, vibratory movements that are produced, as it were, by a blow from a hammer. Such vibratory movement is desirable because it increases the separating efficiency of the machine and especially aids in throwing the kernels of corn on their ends, so that they may readily pass through the perforations of the sieve 5 and through the slots between the bars or rods of the separating grate.

What I claim is:

In a seed corn separator, the combination with a hopper, of an inclined vibratory screen receiving therefrom and having perforations or openings of a size to permit the passage therethrough of small kernels, a vibratory shoe receiving the kernels of corn passed over said screen, said shoe having upper and lower imperforate decks laterally spaced apart and a grate, said grate being made up of parallel laterally spaced rods, the upper ends of which are secured to the under side of said upper deck and the lower ends of which are secured to the upper side of said lower deck, and a grate cleaning device located below said grate comprising an endless carrier and a comb carried thereby, the teeth of which comb work between the rods of said grate and travel longitudinally thereon, substantially as described.

In testimony whereof I affix my signature in presence of two witnesses.

CHARLES F. ASPLUND.

Witnesses:
MALIE HOEL,
F. D. MERCHANT.